United States Patent
He et al.

(10) Patent No.: US 12,137,355 B2
(45) Date of Patent: Nov. 5, 2024

(54) HIGH FREQUENCY BEAM SWITCHING

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Huaning Niu, San Jose, CA (US); Jie Cui, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 440 days.

(21) Appl. No.: 17/593,603

(22) PCT Filed: Oct. 15, 2020

(86) PCT No.: PCT/CN2020/121322
§ 371 (c)(1),
(2) Date: Sep. 21, 2021

(87) PCT Pub. No.: WO2022/077398
PCT Pub. Date: Apr. 21, 2022

(65) Prior Publication Data
US 2022/0303789 A1    Sep. 22, 2022

(51) Int. Cl.
*H04W 16/28*    (2009.01)
*H04W 72/02*    (2009.01)
(Continued)

(52) U.S. Cl.
CPC .......... *H04W 16/28* (2013.01); *H04W 72/02* (2013.01); *H04W 72/046* (2013.01); *H04W 72/21* (2023.01); *H04W 80/02* (2013.01)

(58) Field of Classification Search
CPC ..... H04W 72/21; H04W 16/28; H04W 72/02; H04W 72/046; H04W 36/06; H04W 80/02; H04B 7/0695
See application file for complete search history.

(56) References Cited

U.S. PATENT DOCUMENTS

2013/0163532 A1* 6/2013 Anderson ............. H04L 5/0053
370/329
2019/0313389 A1* 10/2019 John Wilson ......... H04W 72/21
(Continued)

FOREIGN PATENT DOCUMENTS

CN    110521265    11/2019
CN    110958693    4/2020
(Continued)

OTHER PUBLICATIONS

Nokia et al., "Discussion on PUCCH Beam management", 3GPP TSG-RAN WG1 Meeting #93, R1-1807191, Apr. 25, 2018, 2 sheets.
(Continued)

*Primary Examiner* — Brian D Nguyen
(74) *Attorney, Agent, or Firm* — Fay Kaplun & Marcin, LLP

(57) ABSTRACT

A user equipment (UE) and a base station exchange communications to enable the UE to switch beams. The UE receives a physical uplink control channel (PUCCH) resource configuration from the base station, wherein the PUCCH resource configuration includes a plurality of PUCCH resources, receives a signal from the base station based on which one of the plurality of PUCCH resources is activated, performs a beam switching operation to change a transmission beam to a beam corresponding to the activated (Continued)

PUCCH resource and transmits periodic uplink (UL) data using the beam corresponding to the activated PUCCH resource.

19 Claims, 7 Drawing Sheets

(51) Int. Cl.
  *H04W 72/04* (2023.01)
  *H04W 72/044* (2023.01)
  *H04W 72/21* (2023.01)
  *H04W 80/02* (2009.01)

(56) References Cited

U.S. PATENT DOCUMENTS

| | | |
|---|---|---|
| 2020/0044797 A1 | 2/2020 | Guo |
| 2020/0351129 A1* | 11/2020 | Kwak ................... H04W 72/53 |
| 2021/0051648 A1* | 2/2021 | Zhou ..................... H04L 5/0094 |
| 2022/0304027 A1* | 9/2022 | Yang ................. H04W 72/0446 |
| 2022/0393840 A1* | 12/2022 | Määttänen ............ H04L 5/0026 |
| 2023/0053430 A1* | 2/2023 | Määttänen ........... H04B 7/0404 |
| 2023/0171705 A1* | 6/2023 | Go ........................ H04W 52/08 |
| | | 370/318 |
| 2023/0189241 A1* | 6/2023 | Go ........................ H04L 1/1861 |
| 2023/0300812 A1* | 9/2023 | Li ....................... H04W 72/046 |
| | | 370/330 |

FOREIGN PATENT DOCUMENTS

| | | |
|---|---|---|
| CN | 111263449 | 6/2020 |
| WO | 2020/029984 | 2/2020 |
| WO | 2020062318 | 4/2020 |

OTHER PUBLICATIONS

Qualcomm Inc., "Beam Management for NR", 3GPP TSG-RAN WG1 Meeting #94, R1-1809711, Aug. 24, 2018, 16 sheets.

* cited by examiner

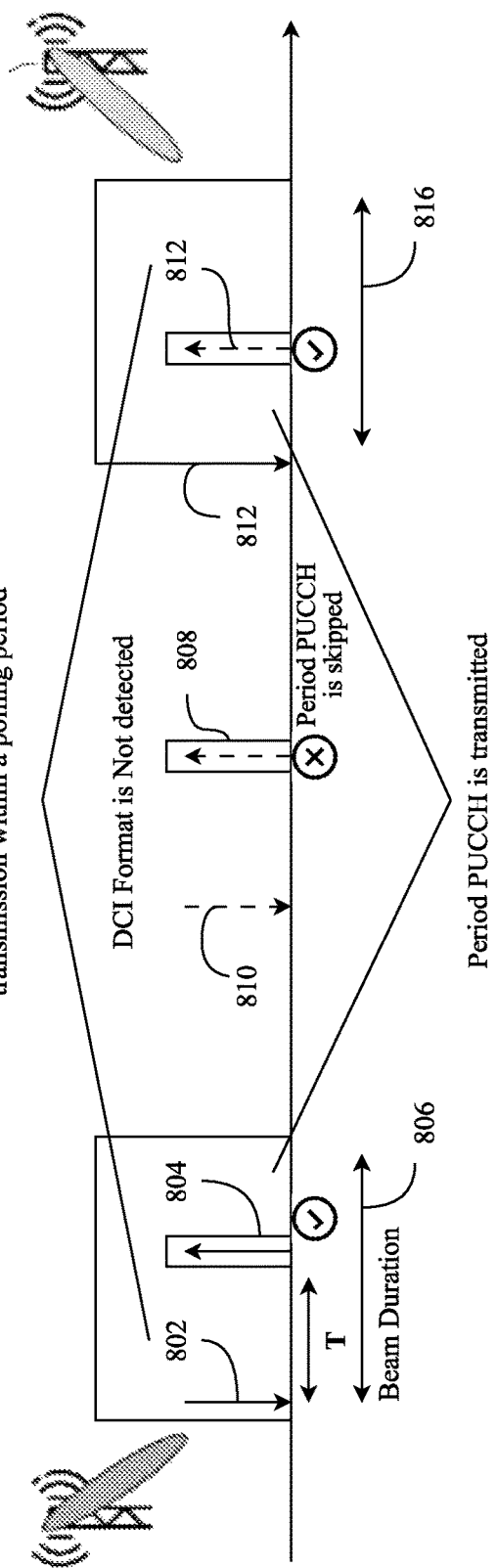
Fig. 8A
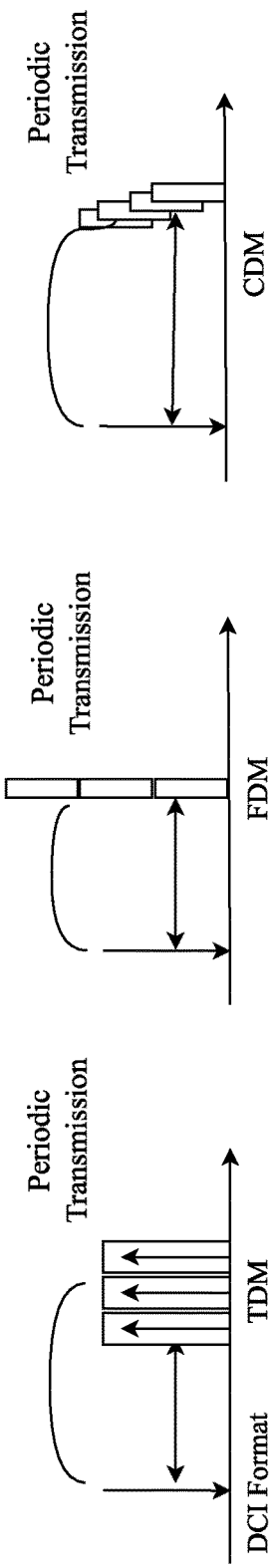
Fig. 8B
Fig. 8C
Fig. 8D

HIGH FREQUENCY BEAM SWITCHING

BACKGROUND

In 5G new radio (NR) wireless communications, the 5G NR network may utilize two primary frequencies bands to exchange data with a user equipment: frequency range 1 (FR1) which is between 410-7,125 MHz and frequency range 2 (FR2) which is between 24.25-52.6 GHz. However, the network does not currently support communications using frequencies above 52.6 GHz. Future releases of 5G NR standards (e.g., 3GPP standards) may support 5G operation in the unlicensed band at frequencies greater than 52.6 GHz. Thus, the 5G network and user equipment (UE) operating on the network need to support various operations in the higher frequency bands.

SUMMARY

Some exemplary embodiments are related to a user equipment (UE) having a transceiver configured to communicate with a base station and a processor communicatively coupled to the transceiver and configured to perform operations. The operations include receiving a physical uplink control channel (PUCCH) resource configuration from the base station, wherein the PUCCH resource configuration includes a plurality of PUCCH resources, receiving a signal from the base station based on which one of the plurality of PUCCH resources is activated, performing a beam switching operation to change a transmission beam to a beam corresponding to the activated PUCCH resource and transmitting periodic uplink (UL) data using the beam corresponding to the activated PUCCH resource.

Other exemplary embodiments are related to a processor configured to perform operations. The operations include receiving a physical uplink control channel (PUCCH) resource configuration from the base station, wherein the PUCCH resource configuration includes a plurality of PUCCH resources, receiving a signal from the base station based on which one of the plurality of PUCCH resources is activated, performing a beam switching operation to change a transmission beam to a beam corresponding to the activated PUCCH resource and transmitting periodic uplink (UL) data using the beam corresponding to the activated PUCCH resource.

Still further exemplary embodiments are related to a user equipment (UE) having a transceiver configured to communicate with a base station and a processor communicatively coupled to the transceiver and configured to perform operations. The operations include receiving a plurality of physical uplink control channel (PUCCH) resources from the base station, wherein each PUCCH resource includes a uplink control information (UCI) field, and wherein each of the plurality of PUCCH resources is configured by the base station to trigger an aperiodic scheduling request (A-SR), activating one of the plurality of PUCCH resources and transmitting a SR to the base station based on the activated PUCCH resource.

Additional exemplary embodiments are related to a base station having a transceiver configured to communicate with a user equipment (UE) and a processor communicatively coupled to the transceiver and configured to perform operations. The operations include configuring a physical uplink control channel (PUCCH) resource configuration for the UE, wherein the PUCCH resource configuration includes a plurality of PUCCH resources, transmitting the PUCCH resource configuration to the UE, transmitting a signal to the UE based on which one of the plurality of PUCCH resources is activated, wherein the signal causes the UE to perform a beam switching operation to change a transmission beam to a beam corresponding to the activated PUCCH resource and receiving periodic uplink (UL) data using the beam corresponding to the activated PUCCH resource.

BRIEF DESCRIPTION OF THE DRAWINGS

FIGS. 8A-8D shows an exemplary diagram illustrating a PUCCH resource validation by a UE according to various exemplary embodiments.

DETAILED DESCRIPTION

Figure 1:
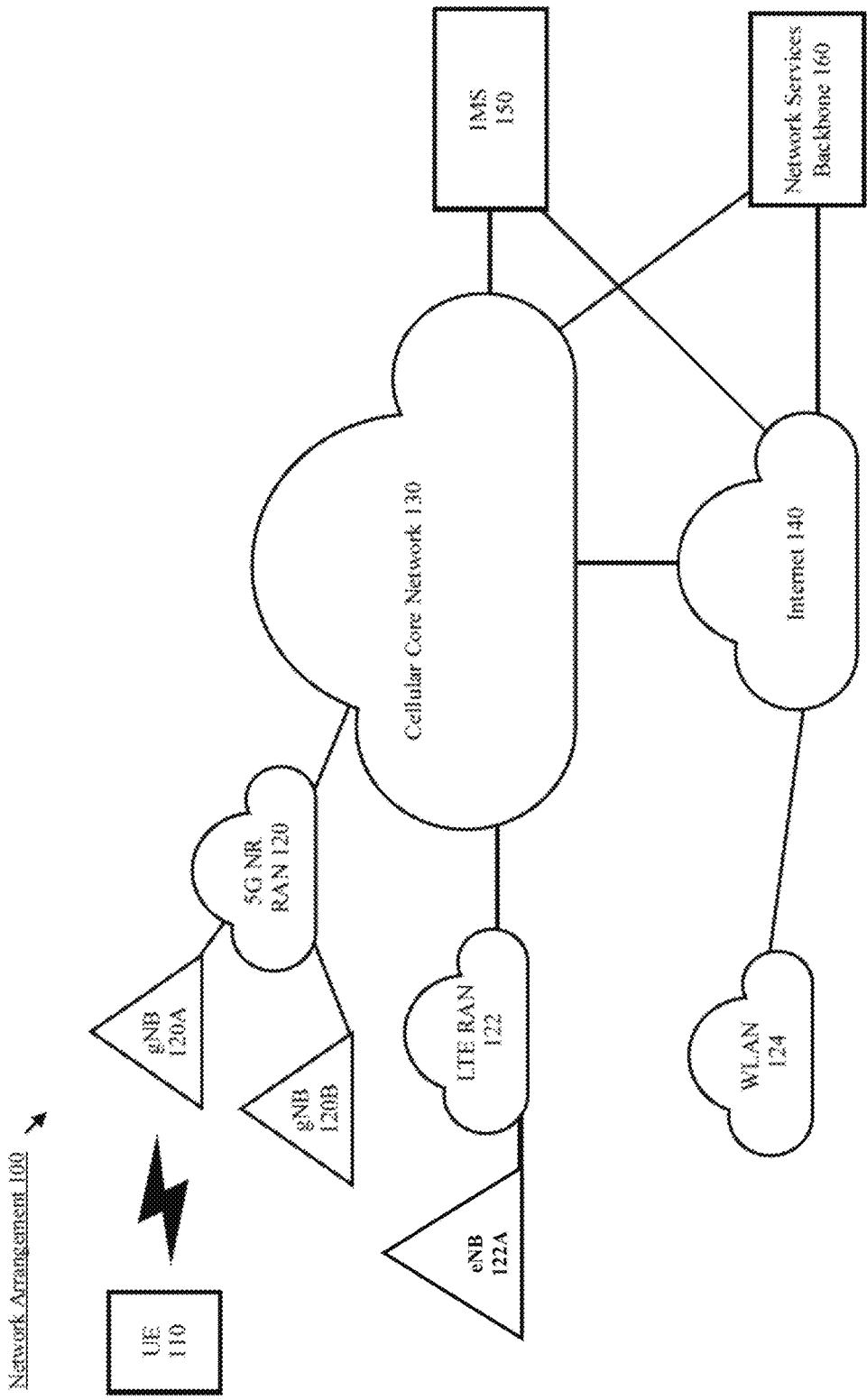
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe a device, system and method for a 5G new radio (NR) network to configure physical uplink control channel (PUCCH) resources for a user equipment (UE) to switch beams.

The exemplary embodiments are described with regard to a network that includes 5G new radio NR radio access technology (RAT). However, the exemplary embodiments may be implemented in other types of networks using the principles described herein.

The exemplary embodiments are also described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

Beamforming is an antenna technique that is utilized to transmit or receive a directional signal. From the perspective of a transmitting device, beamforming may refer to propagating a directional signal. Throughout this description, a beamformed signal may be referred to as a transmitter beam. A transmitter beam may be generated by having a plurality of antenna elements radiate the same signal. Increasing the number of antenna elements radiating the signal decreases the width of the radiation pattern and increases the gain. A transmitter beam may vary in width and be propagated in any of a plurality of directions.

From the perspective of a receiving device, beamforming may refer to tuning a receiver to listen to a direction of interest. Throughout this description, the spatial area encompassed by the receiver listening in the direction of interest may be referred to as a receiver beam. The receiver beam may be generated by configuring the parameters of a spatial filter on a receiver antenna array to listen in a direction of interest and filter out any noise from outside the direction of interest. A receiver beam may also vary in width and be directed in any of a plurality of different directions of interest.

As noted above, the current 5G NR network design does not support communications using frequencies above 52.6 GHz. It would be beneficial to exploit the frequency spectrum above 52.6 GHz to increase the network's capabilities. However, due to higher phase noise, larger propagation loss due to high atmospheric absorption, and lower power amplifier efficiency, utilizing frequencies above 52.6 GHz would require narrow beamforming for transmission and reception. One issue that arises with such narrow beamforming is the difficulty a next generation NodeB (gNB) of the network faces in timely tuning its receiver beam towards a UE, especially in the case of periodic transmissions on the physical uplink control channel (PUCCH) such as, for example, scheduling requests (SR), periodic or semi-persistent channel state information (P-CSI or SP-CSI), and sounding reference signals (SRS). Such transmissions lack a dynamic downlink control information (DCI) format indicating the uplink transmission beam or spatial relation information.

According to some exemplary embodiments, a UE is configured with a group of periodic PUCCH resources each having a different corresponding beam. Subsequently, the gNB transmits a signal to the UE to activate one of the PUCCH resources so that the UE knows which beam the gNB is using to receive uplink information. As a result, the UE may switch beams dynamically, thus allowing for use of frequencies above 52.6 GHz.

FIG. 1 shows an exemplary network arrangement 100 according to various exemplary embodiments. The exemplary network arrangement 100 includes a UE 110. It should be noted that any number of UEs may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. During operation, the UE 110 may be within range of a plurality of gNBs. Thus, either simultaneously or alternatively, the UE 110 may connect to the 5G NR-RAN 120 via the gNBs 120A and 120B. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
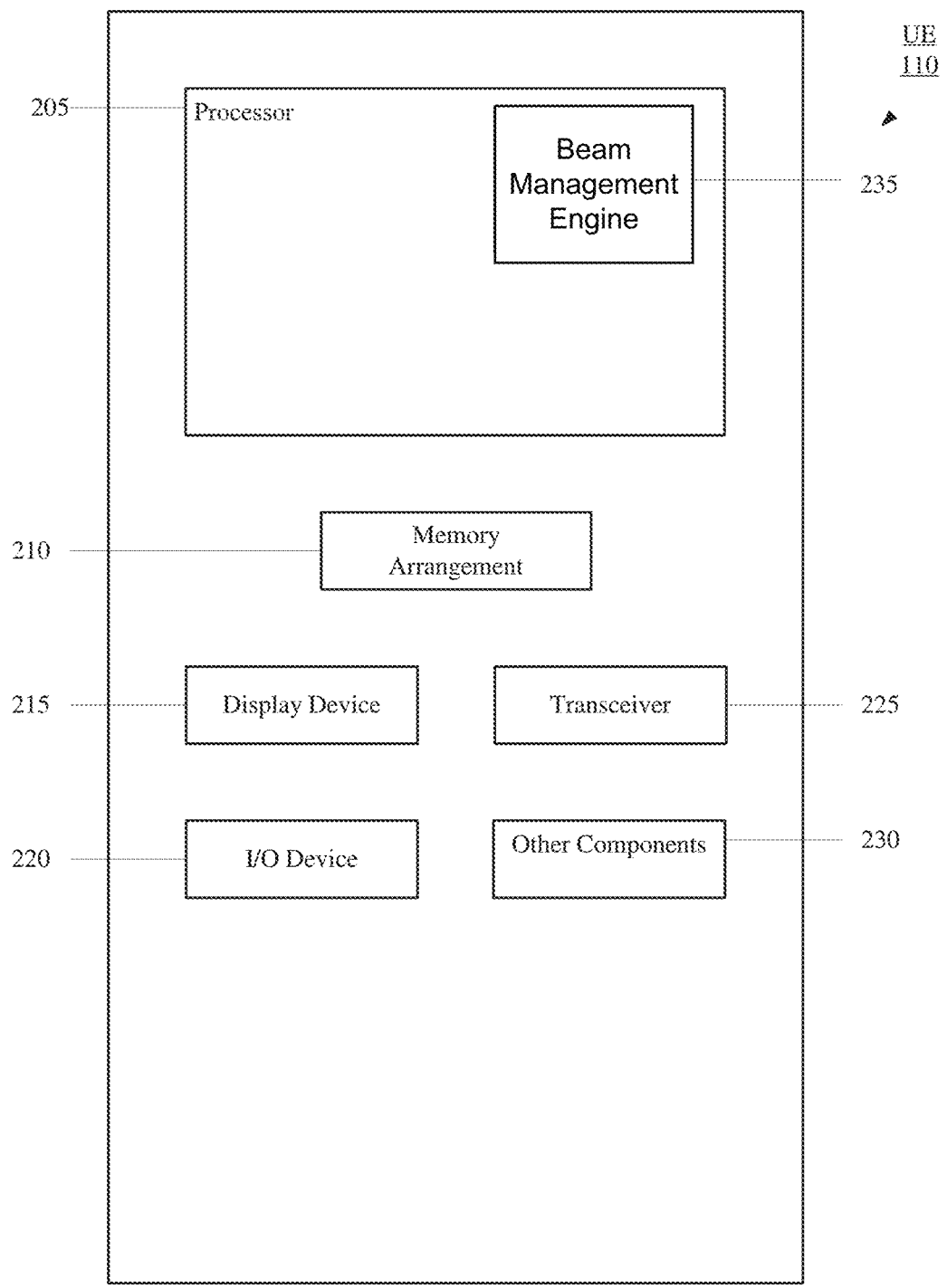
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a beam management engine 235. The beam management engine 235 may perform various operations related to beam switching. Examples of this process will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
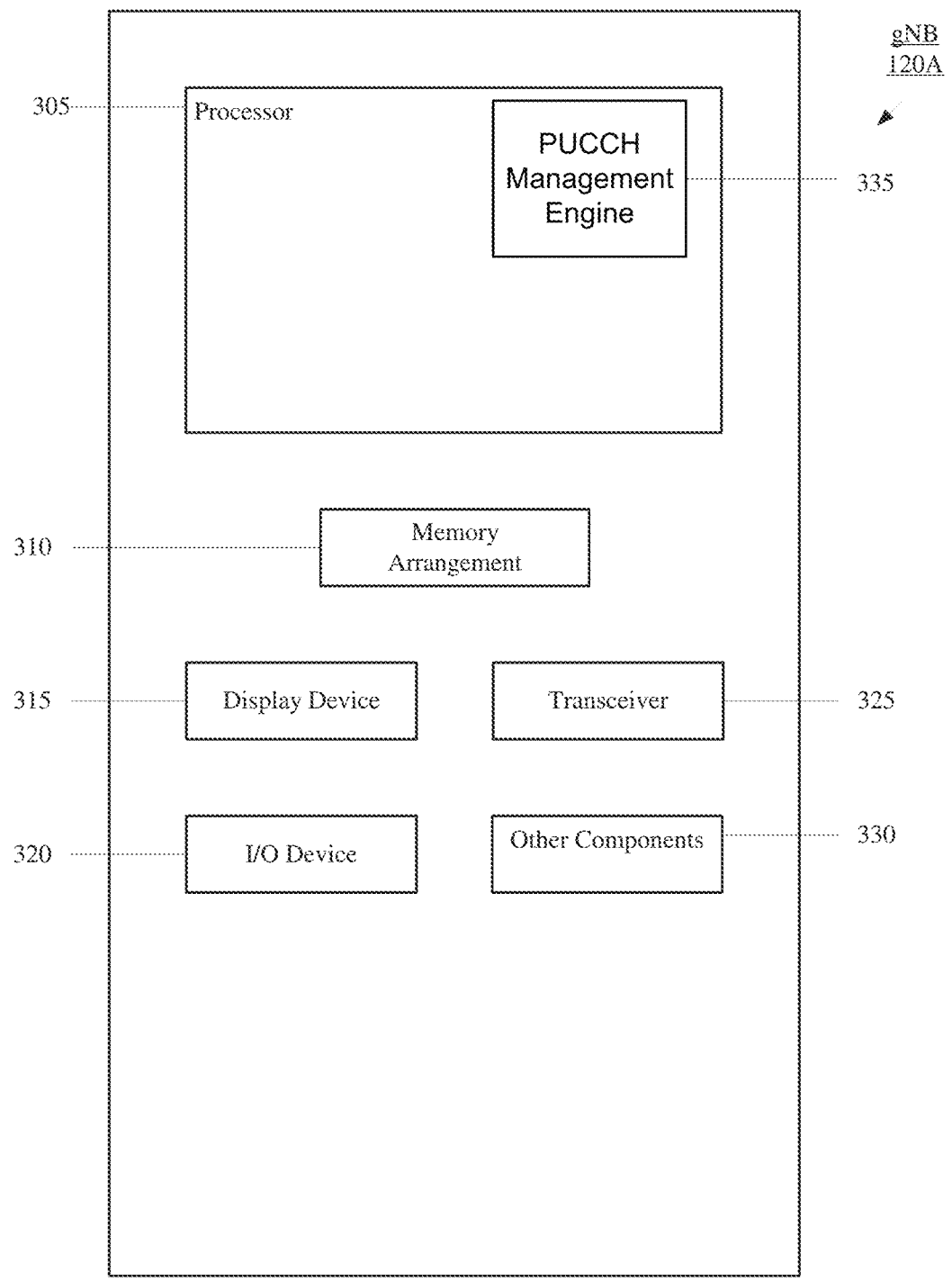
FIG. 3 shows an exemplary base station configured to establish a connection with a user equipment according to various exemplary embodiments.

FIG. 3 shows an exemplary network cell, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a PUCCH management engine 335 for performing operations including configuring and activating PUCCH resources for the UE 110 to perform beam switching operations. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
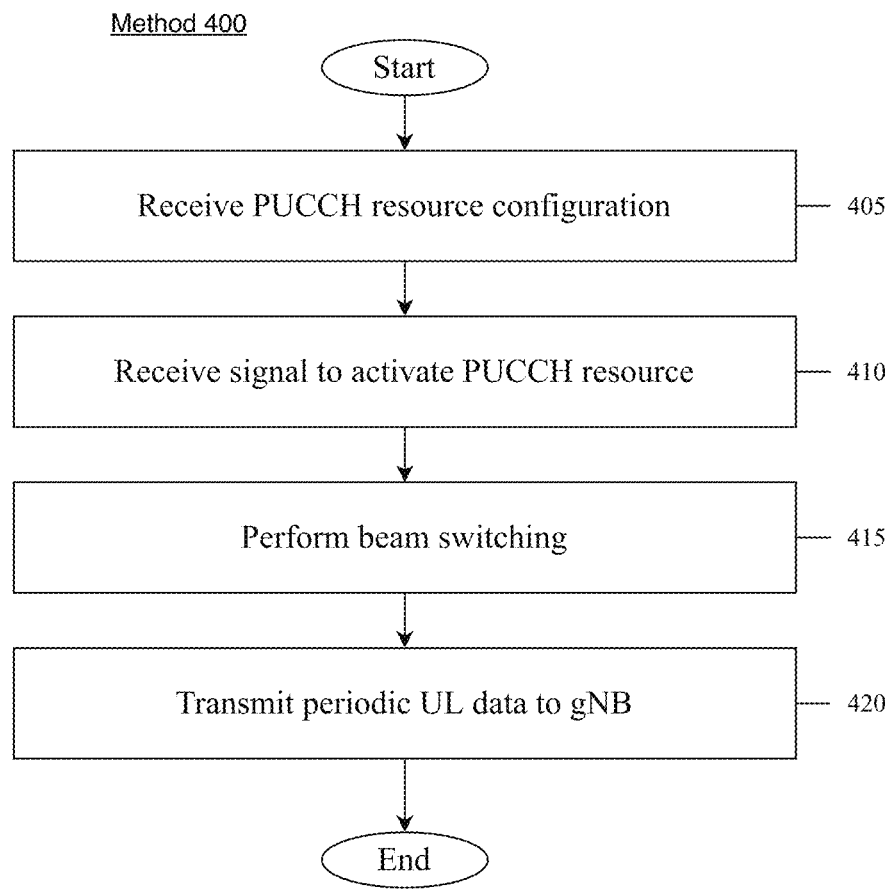
FIG. 4 shows a method of performing a beam switching operation based on a PUCCH resource configuration according to various exemplary embodiments.

FIG. 4 shows a method 400 of performing a beam switching operation based on a PUCCH resource configuration according to various exemplary embodiments. At 405, the UE 110 receives a periodic PUCCH resource configuration from the gNB 120a (or 120b). This periodic PUCCH resource configuration includes a group of periodic PUCCH resources for use by the UE 110 to transmit a SR transmission, a P-CSI/SP-CSI transmission, or a SRS transmission. In some embodiments, each PUCCH resource is configured with a different spatial setting, e.g., each PUCCH resource corresponds to a different beam. Although multiple PUCCH resources (e.g., 8) are configured for a single physical channel (e.g., SR), only one may be activated. As such, the configuration of multiple PUCCH resources does not increase signaling overhead because a corresponding number of UEs (e.g., 8) can share the multiple resources so that one PUCCH resource is activated for each UE at a given time. Thus, the number of resources is not increased based on the number of UEs. Instead, multiple UEs share a resource pool.

In addition to each PUCCH resource being configured with a different spatial setting (e.g., a synchronization signal block (SSB) index or a CSI reference signal (CSI-RS) index), the resources may be configured with different power control parameters (e.g., $P_0$ and $\alpha$ values) due to the different pathlosses associated with the different beams. In order to identify each PUCCH resource, each resource is configured with a group identifier (G-ID) and a resource index within the group.

PUCCH resources within the same group on a serving cell are configured in different symbols with at least $N_{Gap}$ symbol separation. In some embodiments, the value of $N_{Gap}$ may either be reported by the UE as a UE capability to provide some level of flexibility for the UE to determine the gap value, e.g. a tradeoff between complexity and latency performance. In some embodiments, $N_{Gap}$ may be defined by standard (e.g., 3GPP standards) on the basis of subcarrier spacing (SCS).

Figure 5:
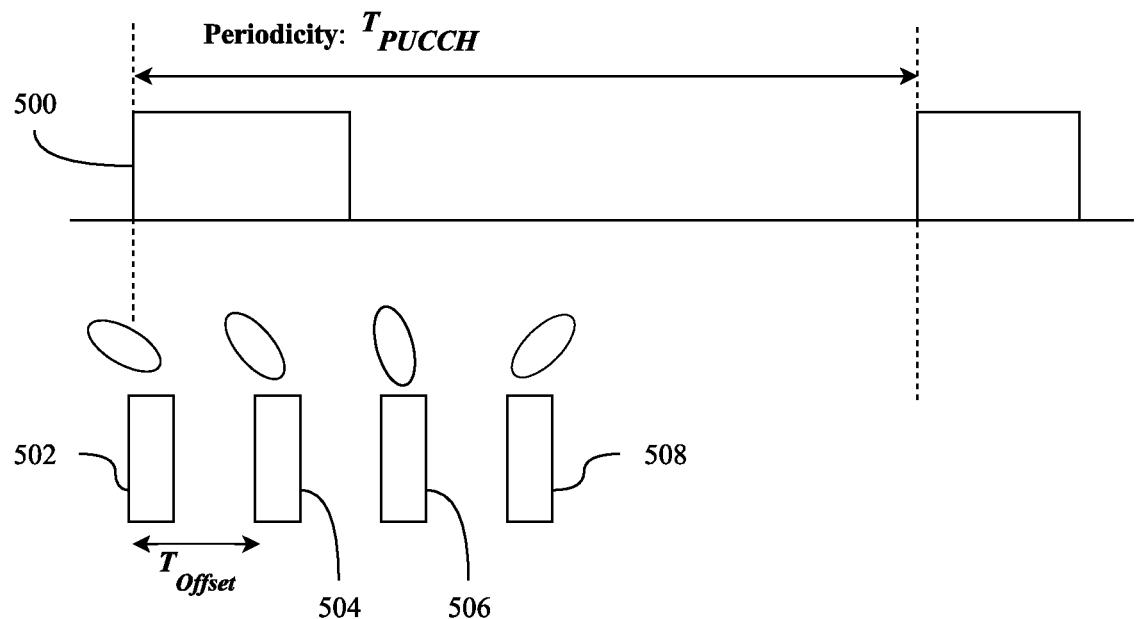
FIG. 5 shows an exemplary diagram illustrating a PUCCH resource configuration according to various exemplary embodiments.

Referring to FIG. 5, in some embodiments, PUCCH resources 502, 504, 506, and 508 within the same PUCCH Resource group 500 each have the same periodicity value ($T_{PUCCH}$). The offset value ($T_{offset}$) may be implicitly determined based on the resource index within the group or may alternatively be explicitly configured by the gNB 120a. In some embodiments, the following equation may be used to determine the time domain resource allocation:

$$(N_{slot}^{frame,u} n_f + N_{s,f}^{u} - T_{offset}) \bmod T_{PUCCH} = 0$$

where $N_{slot}^{frame,u}$ is the number of slots, $n_f$ is the system frame number (SFN), $N_{s,f}^{u}$ is a slot number within a frame for SCS u, and $T_{offset} = k\Delta$, where k is the resource index (0, 1, 2, . . . ) and $k = N_{Gap}$. The PUCCH resources are located in slots that satisfy the above equation. Based on the given periodicity value, the gNB 120a maps or determines the time domain location of PUCCH resources.

In some embodiments, the periodicity ($T_{PUCCH}$) and offset value ($T_{offset}$) may alternatively be explicitly be configured by the gNB via, for example, radio resource control (RRC) signaling for each PUCCH resource. For example, since different resources are associated with different functionalities, then some resources may be configured as fallback resources in case the UE 110 cannot establish a connection with the gNB 120a. In such a scenario, the UE 110 will fall back to the default PUCCH resources. In some embodiments, the default/fallback PUCCH resources may have a longer periodicity compared to the normal PUCCH resources as discussed above. The purpose of the longer periodicity is to ensure that if the gNB 120a cannot obtain the PUCCH resources, the beam misalignment can be corrected within the longer periodicity by using the fallback/default PUCCH resource.

Figure 6A:
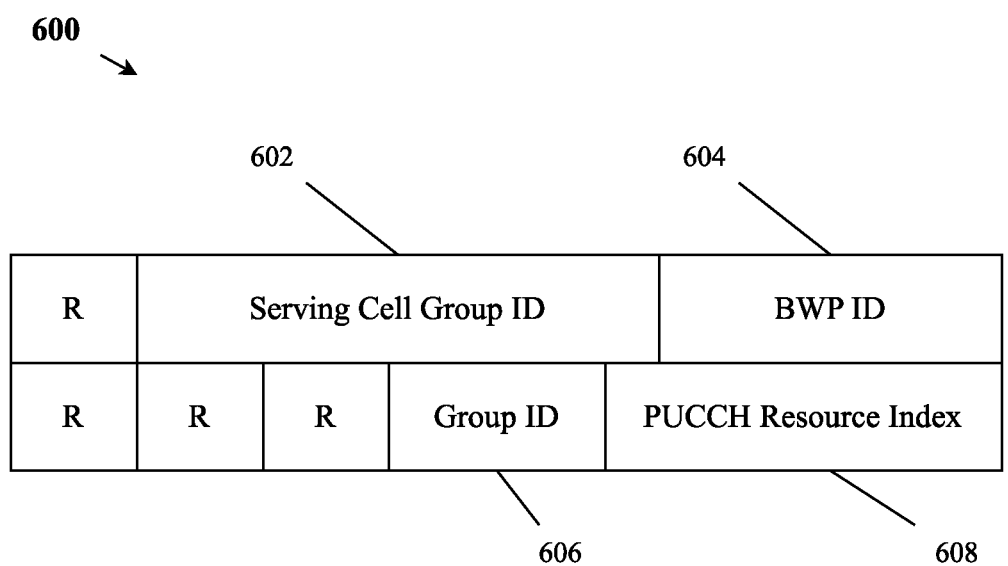
FIGS. 6A and 6B show an exemplary MAC-CE signal configuration according to various exemplary embodiments.
Figure 6B:
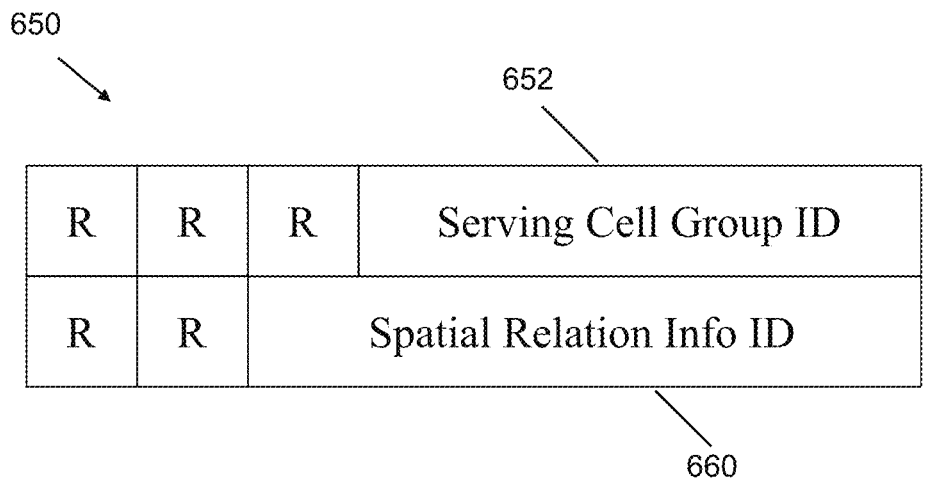

Returning to FIG. 4, at 410, the UE 110 receives a signal from the gNB 120a to activate one of the PUCCH resources. In some embodiments, the UE 110 receives a medium access control control element (MAC-CE) transmission from the gNB 120a at 410 to activate one of the PUCCH resources. FIGS. 6A and 6B show exemplary MAC-CE signal configurations according to various exemplary embodiments. As illustrated in FIG. 6A, a MAC-CE 600 may include a serving cell group ID 602 and a bandwidth part (BWP) ID 604. The serving cell group ID 602 indicates the identity of the serving cell (e.g., gNB 120a) group for which the MAC-CE applies. In some embodiments, the length of the serving cell group ID field is 5 bits. The BWP ID indicates an uplink BWP for which the MAC-CE applies as the codepoint of the DCI bandwidth part field indicator, as specified in 3GPP technical specification (TS) 38.212. In some embodiments, the length of the BWP ID is 2 bits. In such an embodiment, the MAC-CE may include a group ID 606 and a PUCCH resource index 608. The group ID 606 indicates the PUCCH group for which the MAC-CE applies. The PUCCH resource index 608 indicates the activation status (active/inactive) for each PUCCH resource within the PUCCH resource group. Alternatively, the PUCCH resource index 608 may simply indicate which one of the PUCCH resources in the group is active. At 415, the beam at the UE 110 is switched to the beam corresponding to the PUCCH resource indicated as active by the PUCCH resource index 608.

As illustrated in FIG. 6B, a MAC-CE 650 may alternatively only include a serving cell group ID 652. In such an embodiment, the MAC-CE 650 may include a spatial relation info ID 660, which indicates the spatial relation info ID for all PUCCH groups of the indicated serving cell groups. In some embodiments, the spatial relation info ID 660 may alternatively be added to a scheduling DCI Format to trigger the switching or activation/deactivation of a PUCCH resource within a PUCCH group.

Since beam switching is not tied to uplink channels, all periodic channels are negatively impacted by a beam misalignment. As such, the spatial relation info ID 660 directly indicates the spatial relation, which is configured as part of the periodic PUCCH resources. By directly indicating which spatial relation info ID is activated, all associated PUCCH resources are coupled and become activated and all UL channels, regardless of the functionality with which they are associated, are activated. In contrast, the PUCCH resource index 608 of the MAC-CE 600 is associated with one functionality (e.g., SR, SRS, CSI feedback) whereas the spatial relation info ID 660 of the MAC-CE 650 allows for beam switching for all related channels. At 415, the beam at the UE 110 is switched to the beam corresponding to the beam indicated by the spatial relation info ID 660.

In some embodiments, the UE 110 may alternatively autonomously activate one of the PUCCH resources based on data received from the gNB 120a at 410. The UE 110 may then perform a predetermined measurement on the data received from the gNB 120a to determine which of the PUCCH resources to activate. In some embodiments, the data received from the gNB 120a is a reference signal received power (RSRP) threshold value ($X_{Thresh}$) configured by a system information block (SIB) or RRC signaling. After the UE 110 is provided with a group of PUCCH resources at 405, each of which is associated with a different SSB index or CSI-RS index, the UE 110 receives the RSRP threshold from the gNB at 410. Subsequently, the UE 110 selects the first PUCCH resource for which the RSRP of the associated SSB/CSI-RS exceeds $X_{Thresh}$.

Figure 7:
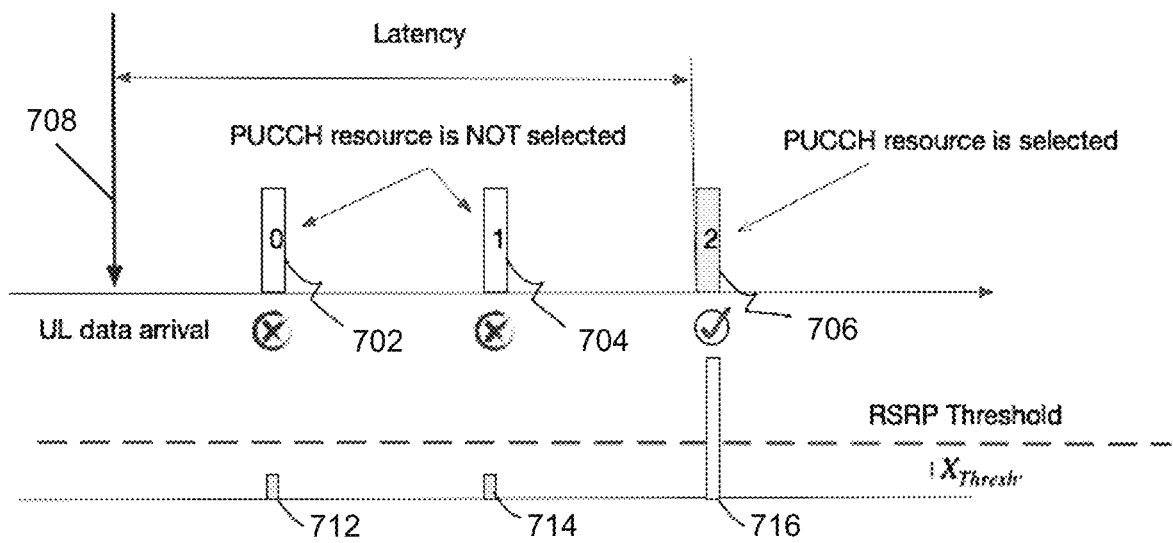
FIG. 7 shows an exemplary diagram illustrating a PUCCH resource selection by a UE according to various exemplary embodiments.

For example, as illustrated in FIG. 7, the UE 110 receives the PUCCH resources 702, 704, and 706 and/or the RSRP threshold value ($X_{Thresh}$) at 708. Each of the PUCCH resources 702, 704, and 706 has an associated measured RSRP 712, 714, and 716, respectively, that is measured by the UE 110. As shown in FIG. 7, the RSRP values 712 and 714 of PUCCH resources 702 and 704 do not meet or exceed $X_{Thresh}$, meaning a mismatch between the reception and transmission beams at the gNB 120a exists for the beams associated with these resources. As such, PUCCH resources 702 and 704 are not selected by the UE, e.g., the beams associated with these resources are not selected for uplink transmission. In contrast, the RSRP value 716 of the PUCCH resource 706 exceeds $X_{Thresh}$. As such, the PUCCH resource 706 is selected by the UE 110. At 415, the beam at the UE 110 is switched to the beam corresponding to the PUCCH resource 706.

Returning to FIG. 4, at 420, the UE transmits the periodic uplink (UL) data to the gNB 120a using the beam described in any of the embodiments described above with respect to FIGS. 5A-7. In some embodiments, the UE 110 may alternatively or additionally receive a downlink control information (DCI) transmission from the gNB 120a at 410. For example, when the gNB 120a switches to a different beam, the gNB 120a may broadcast a message indicating the duration for which the gNB 120a will use a given beam (a beam duration indicator (BDI)). In such an embodiment, a new DCI format (e.g., DCI Format X) may be used by the gNB 120a to provide the BDI for each of a plurality of beams (e.g., $BDI_1$, $BDI_2$, ..., $BDI_N$) to the UE 110. The size of DCI Format X may be configured by higher layer signaling.

In some embodiments, different BDIs may be configured via RRC signaling to a single or different UEs for different beams of a serving cell, assuming the gNB 120a supports simultaneous transmissions of multiple beams. In some embodiments, a different BDI may alternatively be configured by RRC signaling to a single UE 110 for different beams of different component carrier (CC) groups. Each BDI field indicates the remaining beam occupancy duration for a serving cell starting from a first symbol of a slot where UE detects the DCI Format X. In some embodiments, a set of values is configured by RRC signaling, one of which is subsequently dynamically indicated by the BDI field in DCI Format X.

As illustrated in FIG. 8A, after the UE 110 receives a DCI transmission 802/812, the UE 110 may then use the BDI to determine whether a periodic PUCCH resource 804/814 of a periodic uplink transmission falls within a valid beam duration 806/816 indicated by the BDI of the received DCI. If it does, then the UE 110 will transmit the periodic uplink transmission on the beam associated with the PUCCH resource 804/814. The UE 110 will use the paired uplink beam with the detected downlink beam for the PUCCH transmission. However, as also depicted in FIG. 8A, the UE 110 skips a periodic PUCCH resource 808 if a DCI transmission is not detected/received at a monitoring occasion 810. As such, two conditions should be met before the UE 110 transmits a periodic PUCCH transmission: 1) the PUCCH resource is activated and 2) the UE 110 receives a DCI that indicates the PUCCH resource is within the beam duration. A processing time (T) of the DCI Format X, which facilitates UL transmission preparation at the UE side, is defined as the time gap between the received DCI and a first applicable periodic PUCCH resource. In some embodiments, the UE 110 does not expect this gap to be smaller than T, where T may be reported as a UE capability or may instead be defined by standard (e.g., 3GPP standards).

In some embodiments, a DCI may trigger a periodic PUCCH transmission for multiple users within a single beam in a time division multiplexed manner (FIG. 8B), a frequency division multiplexed manner (FIG. 8C), or a code division multiplexed manner (FIG. 8D).

In some embodiments, the gNB 120a may trigger an aperiodic scheduling request (A-SR) transmission that allows the gNB 120a to coordinate SR transmissions and achieve more efficient spatial sweeping for SR detection and also minimize control overhead. Upon detection of a positive A-SR request on a DCI Format Y, the UE 110 commences an A-SR transmission on the corresponding symbol based on the traffic status at the UE side.

In some embodiments, the UE 110 may be configured with a plurality of PUCCH resources having a predetermined PUCCH format (e.g., PUCCH format 0 or 1). Each PUCCH resource is associated with one or more logical channels and a priority class. This embodiment may be based on a service type (e.g., enhanced mobile broadband (eMBB), ultra-reliable and low latency communication (URLLC), etc.). Thus, each SR may have its own latency requirements tailored to those service types. An SR ID is provided to the gNB 120a so that the gNB 120a understands which UL package is associated with the service type.

In some embodiments, the SR ID may be encoded as part of the uplink control information (UCI) payload of the PUCCH resource (e.g., PUCCH format 2 or 3) to facilitate subsequent scheduling by the gNB 120a. The gNB 120a may then either schedule or not schedule the uplink data based on the SR ID and associated service latency requirements.

As illustrated in the table below, in some embodiments, the UE 110 may be configured with a set of triggering states associated with combinations of SR and P-CSI transmissions. For example, 2 bits in the UCI field may indicate the information that the UE 110 will feedback (e.g., "00" indicates that SR will be fed back). When the gNB 120a switches to a beam, the gNB 120 has the flexibility to trigger different combinations of UCI feedback, not limited to only SR. This may improve the efficiency at the gNB 120a because the number of UEs utilizing a beam is limited. As such, when the gNB 120a switches to a beam, it receives as much UCI information as possible.

| Value of UCI triggering | UCI context | PUCCH resource |
|---|---|---|
| '00' | SR | The associated PUCCH resource configured by higher layer |
| '01' | SR + P-CSI | The associated PUCCH resource configured by higher layer |
| '10' | SR + SRS | The associated PUCCH resource and SRS |
| '11' | P-CSI Only | resource configured by higher layer The associated PUCCH resource configured by higher layer |

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:
1. A user equipment (UE), comprising:
a transceiver configured to communicate with a base station; and
a processor communicatively coupled to the transceiver and configured to perform operations comprising:
receiving a physical uplink control channel (PUCCH) resource configuration from the base station, wherein the PUCCH resource configuration includes a plurality of PUCCH resources, each PUCCH resource comprising at least a corresponding transmission beam;
receiving a signal from the base station, the signal providing instruction to activate one of the plurality of PUCCH resources;
evaluating a reference signal received power (RSRP) associated with the activated PUCCH resource as being above a reference signal received power threshold value;

selecting a first one of the plurality of PUCCH resources as the activated PUCCH resource having a RSRP greater than the reference signal received power threshold value, when the instructed activated PUCCH has a RSRP less than the threshold value;

performing a beam switching operation to change a transmission beam to a transmission beam corresponding to the activated PUCCH resource; and transmitting periodic uplink (UL) data using the transmission beam corresponding to the activated PUCCH resource.

2. The UE of claim 1, wherein each of the plurality of PUCCH resources is configured with a different spatial setting.

3. The UE of claim 1, wherein the plurality of PUCCH resources are part of a plurality of groups, each group being associated with a serving cell, and wherein each PUCCH resource is configured with a group identifier (G-ID) identifying which of the plurality of groups a PUCCH resource is associated and a PUCCH resource index identifying a PUCCH resource within an associated group.

4. The UE of claim 3, wherein PUCCH resources in a same group are configured in different symbols separated by a predetermined spacing, and wherein the PUCCH resources in the same group have a same periodicity.

5. The UE of claim 3, wherein PUCCH resources in a same group are configured in different symbols separated by a predetermined spacing, and wherein each of the PUCCH resources in the same group have a differently configured periodicity.

6. The UE of claim 1, wherein the signal is a medium access control control element (MAC-CE) transmission, wherein the MAC-CE transmission includes a group ID and a PUCCH resource index, wherein the group ID indicates a PUCCH group of resources to which the MAC-CE transmission applies, and wherein the activated PUCCH resource is indicated by the PUCCH resource index.

7. The UE of claim 1, wherein the signal is a medium access control control element (MAC-CE) transmission, wherein the MAC-CE transmission includes a spatial relation info ID indicating the beam for transmitting the periodic UL data.

8. The UE of claim 1, wherein the signal includes the reference signal received power (RSRP) threshold value.

9. The UE of claim 1, wherein the signal includes a beam duration indicator (BDI) indicating a beam occupancy duration for a receiver beam at the base station.

10. The UE of claim 9, wherein the transmission of the uplink (UL) data of the activated PUCCH resource falls within the beam occupancy duration indicated by the BDI.

11. A processor configured to perform operations comprising:

receiving a physical uplink control channel (PUCCH) resource configuration from a base station, wherein the PUCCH resource configuration includes a plurality of PUCCH resources, each of the plurality of PUCCH resources comprising at least a transmission beam;

receiving a signal from the base station, the signal providing instruction to activate one of the plurality of PUCCH resources;

determining whether a reference signal received power of the activated PUCCH resource is greater than a reference signal received power threshold;

selecting another one of the plurality of PUCCH resources as the activated PUCCH when the instructed activated PUCCH resource reference signal received power is less than the received signal reference power threshold;

performing a beam switching operation to change a transmission beam to a transmission beam corresponding to the activated PUCCH resource; and transmitting periodic uplink (UL) data using the transmission beam corresponding to the activated PUCCH resource.

12. The processor of claim 11, wherein each of the plurality of PUCCH resources is configured with a different spatial setting.

13. The processor of claim 11, wherein the plurality of PUCCH resources are part of a plurality of groups, each group being associated with a serving cell, and wherein each PUCCH resource is configured with a group identifier (G-ID) identifying with which group a PUCCH resource is associated and a PUCCH resource index identifying a PUCCH resource within the each group.

14. The processor of claim 13, wherein PUCCH resources in the same group are configured in different symbols separated by a predetermined spacing, and wherein the PUCCH resources in the same group have one of: a same periodicity and a differently configured periodicity.

15. The processor of claim 11, wherein the signal includes the reference signal received power (RSRP) threshold value.

16. A user equipment (UE), comprising:

a transceiver configured to communicate with a base station; and a processor communicatively coupled to the transceiver and configured to perform operations comprising:

receiving, through the transceiver, a plurality of physical uplink control channel (PUCCH) resources from the base station, wherein each PUCCH resource includes an uplink control information (UCI) field, and wherein each of the plurality of PUCCH resources is configured by the base station to trigger an aperiodic scheduling request (A-SR);

activating one of the plurality of PUCCH resources, wherein a RSRP of the activated PUCCH is greater than a RSRP threshold value; and transmitting, through the transceiver, an SR to the base station based on the activated PUCCH resource.

17. The UE of claim 16, wherein the plurality of PUCCH resources are received in one of a PUCCH Format 0 or PUCCH Format 1.

18. The UE of claim 16, wherein an SR identifier (SR ID) is configured in the UCI field, and wherein the SR ID is configured to facilitate triggering of the A-SR by the base station.

19. The UE of claim 16, wherein the UE is configured with a predetermined set of A-SR triggering states, each of which is associated with one or more of the scheduling request transmission and a periodic channel station information (P-CSI) transmission.

* * * * *